(12) United States Patent
Peranandam et al.

(10) Patent No.: US 10,325,021 B2
(45) Date of Patent: Jun. 18, 2019

(54) PHRASE EXTRACTION TEXT ANALYSIS METHOD AND SYSTEM

(71) Applicant: GM GLOBAL TECHNOLOGY OPERATIONS LLC, Detroit, MI (US)

(72) Inventors: Prakash Mohan Peranandam, Troy, MI (US); Soumen De, Karnataka (IN)

(73) Assignee: GM Global Technology Operations LLC, Detroit, MI (US)

( * ) Notice: Subject to any disclaimer, the term of this patent is extended or adjusted under 35 U.S.C. 154(b) by 46 days.

(21) Appl. No.: 15/627,380

(22) Filed: Jun. 19, 2017

(65) Prior Publication Data

US 2018/0365222 A1  Dec. 20, 2018

(51) Int. Cl.
*G06F 17/30* (2006.01)
*G06F 17/27* (2006.01)

(52) U.S. Cl.
CPC ........ *G06F 17/2785* (2013.01); *G06F 17/274* (2013.01); *G06F 17/277* (2013.01); *G06F 17/2795* (2013.01)

(58) Field of Classification Search
CPC ................................. G06F 17/30; G06F 17/22
USPC .............................................. 704/9; 707/758
See application file for complete search history.

(56) References Cited

U.S. PATENT DOCUMENTS

| | | | |
|---|---|---|---|
| 7,092,937 B2 | 8/2006 | Morgan et al. | |
| 7,444,216 B2* | 10/2008 | Rogers | G06F 3/0481 |
| | | | 701/31.4 |
| 7,627,551 B2 | 12/2009 | Morgan | |
| 8,176,048 B2 | 5/2012 | Morgan | |
| 8,190,423 B2 | 5/2012 | Rehberg et al. | |
| 8,219,519 B2 | 7/2012 | Chakrabarty et al. | |
| 8,489,601 B2 | 7/2013 | Rajpathak | |
| 9,443,010 B1* | 9/2016 | Sundeby | G06F 16/784 |
| 2005/0033567 A1* | 2/2005 | Sukehiro | G06F 17/2755 |
| | | | 704/8 |
| 2005/0120011 A1* | 6/2005 | Dehlinger | G06F 17/2705 |
| 2005/0193004 A1 | 9/2005 | Cafeo et al. | |
| 2008/0307523 A1 | 12/2008 | Subramanyam et al. | |
| 2009/0265364 A1 | 10/2009 | Morgan et al. | |
| 2010/0017167 A1* | 1/2010 | Duc | G05B 23/0251 |
| | | | 702/185 |
| 2010/0191414 A1 | 7/2010 | Salman et al. | |

(Continued)

OTHER PUBLICATIONS

Rajpathak et al., "A data- and ontology-driven text mining-based construction of reliability model to analyze and predict component failures." Knowledge and Information Systems 46.1 (2016): 87-113.*

(Continued)

*Primary Examiner* — Seong-Ah A Shin
(74) *Attorney, Agent, or Firm* — Reising Ethington P.C.; James Howard (57) ABSTRACT

A system and method for extracting a relevant phrase from text. The system and method may build a plurality of n-gram phrases using a seed from a seed list as a start, a middle, or an end of each n-gram phrase. The seed list may be directed to a specific vehicle system and each seed may indicate a symptom, part, or action to extract relevant phrases from vehicle information verbatims. The plurality of n-gram phrases may be filtered to obtain one or more relevant phrases. The filtering process may include calculating an external relevance factor, an internal relevance factor, or a context pattern relevance factor.

13 Claims, 3 Drawing Sheets

(56) References Cited

U.S. PATENT DOCUMENTS

| | | |
|---|---|---|
| 2010/0250522 A1 | 9/2010 | Chakrabarty |
| 2010/0287174 A1 | 11/2010 | Yang et al. |
| 2011/0015967 A1 | 1/2011 | Bhattacharya et al. |
| 2012/0143880 A1* | 6/2012 | Sweeney ............ G06F 16/9535 707/749 |
| 2013/0290338 A1* | 10/2013 | Lee ...................... G06F 16/285 707/739 |
| 2015/0066939 A1* | 3/2015 | Misra .................... G06F 16/355 707/739 |
| 2015/0081729 A1* | 3/2015 | Rajpathak ............ G06F 16/284 707/758 |
| 2015/0286631 A1* | 10/2015 | Sethu .................. G06F 17/2211 704/9 |
| 2015/0286712 A1* | 10/2015 | Donndelinger ....... G06F 16/367 707/701 |
| 2017/0017638 A1* | 1/2017 | Satyavarta ............ G06F 17/278 |
| 2018/0046721 A1* | 2/2018 | Thornton ............ G06F 16/9535 |

OTHER PUBLICATIONS

Rajpathak et al., "A data- and ontology-driven text mining-based construction of reliability model to analyze and predict component failures." Knowledge and Information Systems 46.1 (2016): 87-113 (Year: 2016).*

U.S. Appl. No. 15/041,542, filed Feb. 11, 2016, 23 pages.

* cited by examiner

PHRASE EXTRACTION TEXT ANALYSIS METHOD AND SYSTEM

INTRODUCTION

The technical field relates to text analysis and, more particularly, to systems and methods for recognizing relevant phrases relating to vehicle information.

Vehicle information such as service records, warranty claims, and customer opinion data can take many forms, and a large number of documents relating to such information may exist for a fleet of vehicles. Efficient processing of such information can provide for a reduction in irrelevant or non-useful phrases, as well as reducing processing time and memory intensive computing requirements.

SUMMARY

According to an embodiment, there is provided a method for extracting a relevant phrase from text, comprising the steps of accessing a vehicle information verbatim from a database, tokenizing the vehicle information verbatim, and building a plurality of n-gram phrases from the vehicle information verbatim. The plurality of n-gram phrases include a seed from a seed list as a start, a middle, or an end of each n-gram phrase of the plurality of n-gram phrases. The seed list includes a plurality of seeds, each seed being directed to a vehicle-related component or a vehicle-related functionality. The method further includes filtering the plurality of n-gram phrases to obtain the relevant phrase or an irrelevant phrase.

In a more particular embodiment, the seed list is directed to a specific vehicle system.

In another more particular embodiment, the seeds identify symptoms, parts, or actions.

In another more particular embodiment, the filtering step includes calculating an external relevance factor.

In another more particular embodiment, a training phase and a testing phase are performed, and the external relevance factor accounts for a total number of n-gram phrases having a same length in the training phase, the total number of n-gram phrases having the same length in the testing phase, a frequency of a word sequence in the training phase, and the frequency of the word sequence in the testing phase.

In another more particular embodiment, the filtering step includes calculating an internal relevance factor.

In another more particular embodiment, the internal relevance factor takes into account a term frequency—inverse document frequency (tf-idf) analysis of vehicle information in the database.

In another more particular embodiment, the filtering step includes calculating a context pattern relevance factor.

In another more particular embodiment, the context pattern relevance factor is a binary value that depends on whether the n-gram phrase has a relevant part of speech (POS) tag sequence or an irrelevant POS tag sequence.

In another more particular embodiment, the filtering step includes calculating an external relevance factor, an internal relevance factor, and a context pattern relevance factor.

In another more particular embodiment, a weak filtering rule set is used to conjunctively consider the external relevance factor, the internal relevance factor, and the context pattern relevance factor so that n-gram phrases are irrelevant if an irrelevance threshold is met for each of the external relevance factor, the internal relevance factor, and the context pattern relevance factor.

In another more particular embodiment, a strong filtering rule set is used to disjunctively consider the external relevance factor, the internal relevance factor, and the context pattern relevance factor so that n-gram phrases are irrelevant if an irrelevance threshold is met for one of the external relevance factor, the internal relevance factor, or the context pattern relevance factor.

In another more particular embodiment, the method further includes the step of categorizing terms in the relevant phrase in a domain according to a property of each term and a relation between the terms in a data organizational system.

According to another embodiment, there is provided a method for extracting a relevant phrase from text. The method includes the steps of accessing a verbatim from a database, tokenizing the verbatim, and building a plurality of n-gram phrases from the verbatim. The plurality of n-gram phrases include a seed from a seed list as a start, a middle, or an end of each n-gram phrase of the plurality of n-gram phrases. The seed list includes a plurality of seeds. The method includes calculating an external relevance factor for each n-gram phrase of the plurality of n-gram phrases, calculating an internal relevance factor for each n-gram phrase of the plurality of n-gram phrases, calculating a context pattern relevance factor for each n-gram phrase of the plurality of n-gram phrases, and using the external relevance factor, the internal relevance factor, the context pattern relevance factor, or a combination of one or more of the external relevance factor, the internal relevance factor, and the context pattern relevance factor to identify the relevant phrase or an irrelevant phrase from the plurality of n-gram phrases.

In a more particular embodiment, a weak filtering rule set is used to conjunctively consider the external relevance factor, the internal relevance factor, and the context pattern relevance factor so that n-gram phrases are irrelevant if an irrelevance threshold is met for each of the external relevance factor, the internal relevance factor, and the context pattern relevance factor.

In a more particular embodiment, a strong filtering rule set is used to disjunctively consider the external relevance factor, the internal relevance factor, and the context pattern relevance factor so that n-gram phrases are irrelevant if an irrelevance threshold is met for one of the external relevance factor, the internal relevance factor, or the context pattern relevance factor.

In a more particular embodiment, the verbatim is a vehicle information verbatim and the seed list is directed to a specific vehicle system.

In a more particular embodiment, the seeds identify symptoms, parts, or actions.

According to another embodiment, there is provided a system for extracting a relevant phrase from text. The system comprises a database containing a vehicle information verbatim and an n-gram building tool configured to build a plurality of n-gram phrases from the vehicle information verbatim. The plurality of n-gram phrases include a seed from a seed list as a start, a middle, or an end of each n-gram phrase of the plurality of n-gram phrases. The seed list includes a plurality of seeds, each seed being directed to a vehicle-related component or a vehicle-related functionality. The system further comprises a filtering tool configured to filter the plurality of n-gram phrases to obtain the relevant phrase or an irrelevant phrase.

In a more particular embodiment, the system further comprises a data organizational system configured to categorize terms in the relevant phrase in a domain according to a property of each term and a relation between the terms.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENTS

The systems and methods described below can provide for efficient extraction of relevant phrases from text. The systems and methods may use a seed from a seed list to build an n-gram phrase. In one embodiment, the seed is directed to a vehicle-related component or a vehicle-related functionality. After building the n-gram phrases, the n-gram phrases may be filtered. In one embodiment, the filtering process includes calculating an external relevance factor for each n-gram phrase, calculating an internal relevance factor for each n-gram phrase, and calculating a context pattern relevance factor for each n-gram phrase. A filtration rule set may be used to weight, average, or otherwise combine the external relevance factor, the internal relevance factor, and/or the context pattern relevance factor in such a way so as to identify a relevant phrase or an irrelevant phrase from the plurality of n-gram phrases.

The text analysis systems and methods may be used to process vehicle information verbatims which can cover a wide variety of vehicle-related topics from a number of sources. For example, vehicle information verbatims can include service records that describe vehicle repairs, which can be provided by vehicle service centers, such as vehicle dealerships delivering vehicle maintenance and diagnostic services. Vehicle service records can also be supplied by call centers that provide vehicle telematics service to the vehicle and as part of that service, gather feedback regarding the symptoms, parts, and actions taken to adjust vehicle operation. Vehicle information verbatims may also include warranty claim records, customer opinion data from social media or another source, or any other vehicle-related data where finding particular trends, keywords, relevant phases, etc., may be useful.

Figure 1:
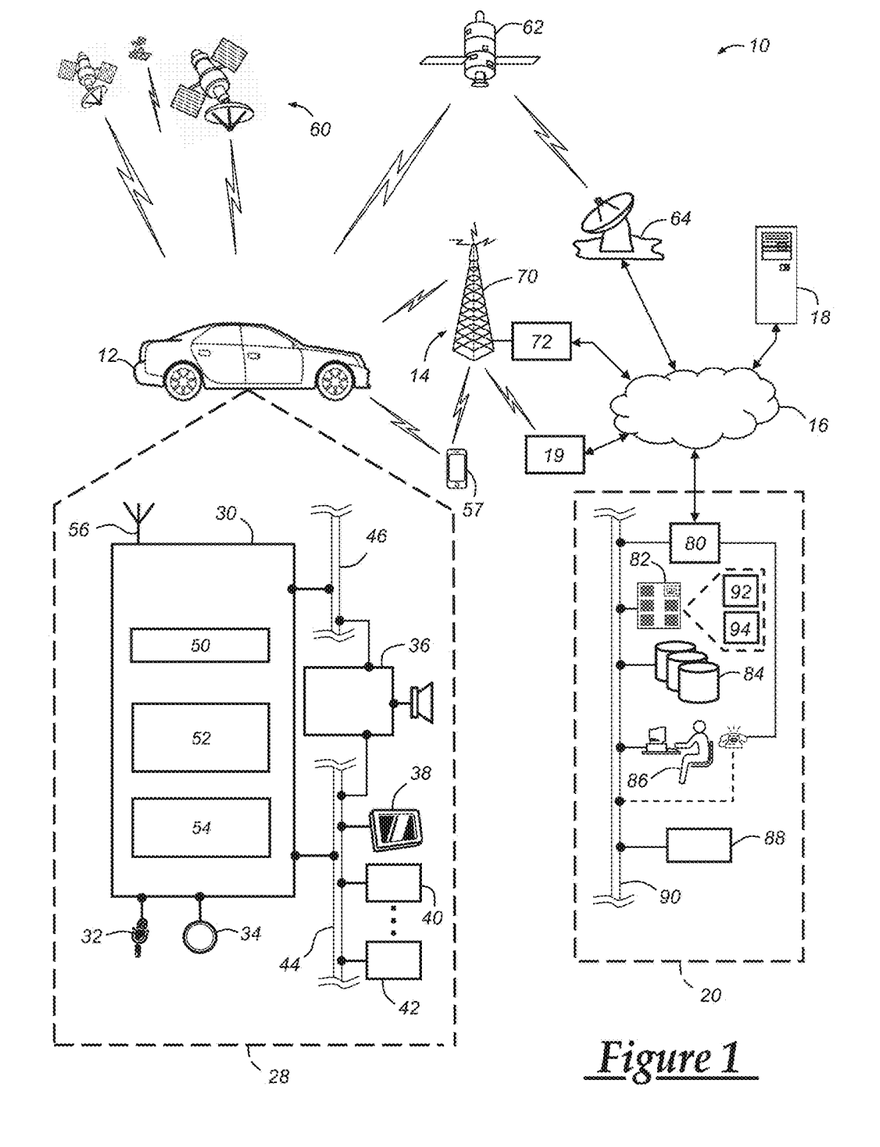
FIG. 1 is a block diagram depicting an embodiment of a system that is capable of utilizing the methods disclosed herein.

With reference to FIG. 1, there is shown an operating environment that comprises a mobile vehicle communications system 10 and that can be used as part of gathering text for use with the method and systems disclosed herein. Communications system 10 generally includes a vehicle 12, one or more wireless carrier systems 14, a land communications network 16, a computer 18, a vehicle service center 19, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other system configurations are certainly possible, and systems not shown here could employ the disclosed methods as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 is itself a vehicle system module (VSM) and can be implemented as an OEM-installed (embedded) or aftermarket device installed in the vehicle that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned. IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown) diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

A mobile device 57 belonging to a vehicle occupant may interact with the vehicle 12, such as via the telematics unit 30, or with the wireless carrier system 14. The mobile device 57 can include computer processing capability, a transceiver capable of communicating using a short-range wireless protocol, and a visual mobile device display. The mobile device 57 also includes one or more microprocessors that execute machine code to generate logical output. Examples of the mobile device 57 include the iPhone manufactured by Apple and the Galaxy manufactured by Samsung, as well as others. While the mobile device 57 may include the ability to communicate via cellular communications using the wireless carrier system 14, this is not always the case. For instance, Apple manufactures devices such as the various models of the iPad and iPod Touch that include the processing capability, the display 59, and the ability to communicate over a short-range wireless communication link. However, the iPod Touch™ and some iPads™ do not have cellular communication capabilities. Even so, these and other similar devices may be used or considered a type of wireless device, such as the mobile device 57, for the purposes of the generating text to be analyzed via the systems and methods described herein.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

The service center 19 is a location where vehicle owners bring the vehicle 12 for routine maintenance or resolution of vehicle trouble. There, vehicle service personnel can observe the vehicle and analyze vehicle trouble using a variety of tools, such as computer-based scan tools that obtain diagnostic trouble codes (DTCs) stored in the vehicle 12. As part of maintaining the vehicle 12 or analyzing vehicle trouble, vehicle technicians may memorialize the analysis in a service report, which can include the symptoms observed or reported, the parts affected, and the actions carried out by the vehicle technicians. The service records for vehicles serviced by the service center 19 can be stored at the center 19 or transmitted to a central facility, such as the call center 20, via the wireless carrier system 14 and/or the land network 16. The service center 19 may also store or transmit records relating to warranty claims.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Server 82 may include a software framework for accommodating an n-gram building tool 92 and a filtering tool 94. While these tools are schematically shown as being separate in FIG. 1, it is possible for one software framework or platform to execute both n-gram building and filtering, and accordingly, the n-gram building tool 92 and the filtering tool 94 would be executed via the same platform. Similarly, it is possible for the n-gram building tool 92 and the filtering tool 94 to be executed via separate servers or processing devices, even those remote from the call center 20. For example, it is possible for the n-gram building tool 92 or the filtering tool 94 to be cloud- or web-based systems or implemented in some other operable format.

Database 84 may be a vehicle information database that stores vehicle-related text information for use with the present systems and methods. Database 84 can store account information such as subscriber authentication information, vehicle identifiers, profile records, behavioral patterns, and other vehicle information. As with server 82, it is possible for the database 84 to be implemented in other operable fashions, such as a cloud- or web-based system that is not directly related to the call center 20. Further, it is possible for the methods and systems herein to extract text from a number of discrete databases. In one embodiment, the vehicle information database is any storage implementation or source containing vehicle-related information.

Server 82 and its database 84 may be implemented in a known manner using an electronic processor with non-transitory computer readable memory storing program code that, upon execution by the processor, carries out the methods described herein, and with that same memory or a separate non-transitory computer readable memory used as database 84 to store the data used in the methods described herein, such as the service records (text to be analyzed), the list of verbatim, the seed list, and n-gram phrases, all of which are described in greater detail below. The server 82 may thus be configured as a special purpose text analyzer that includes the building tool 92 and filtering tool 94, both of which may be implemented using the processor operating under control of the program code to provide a system that carries out some or all of the steps of methods 200, 300, and 400 described below.

Figure 2:
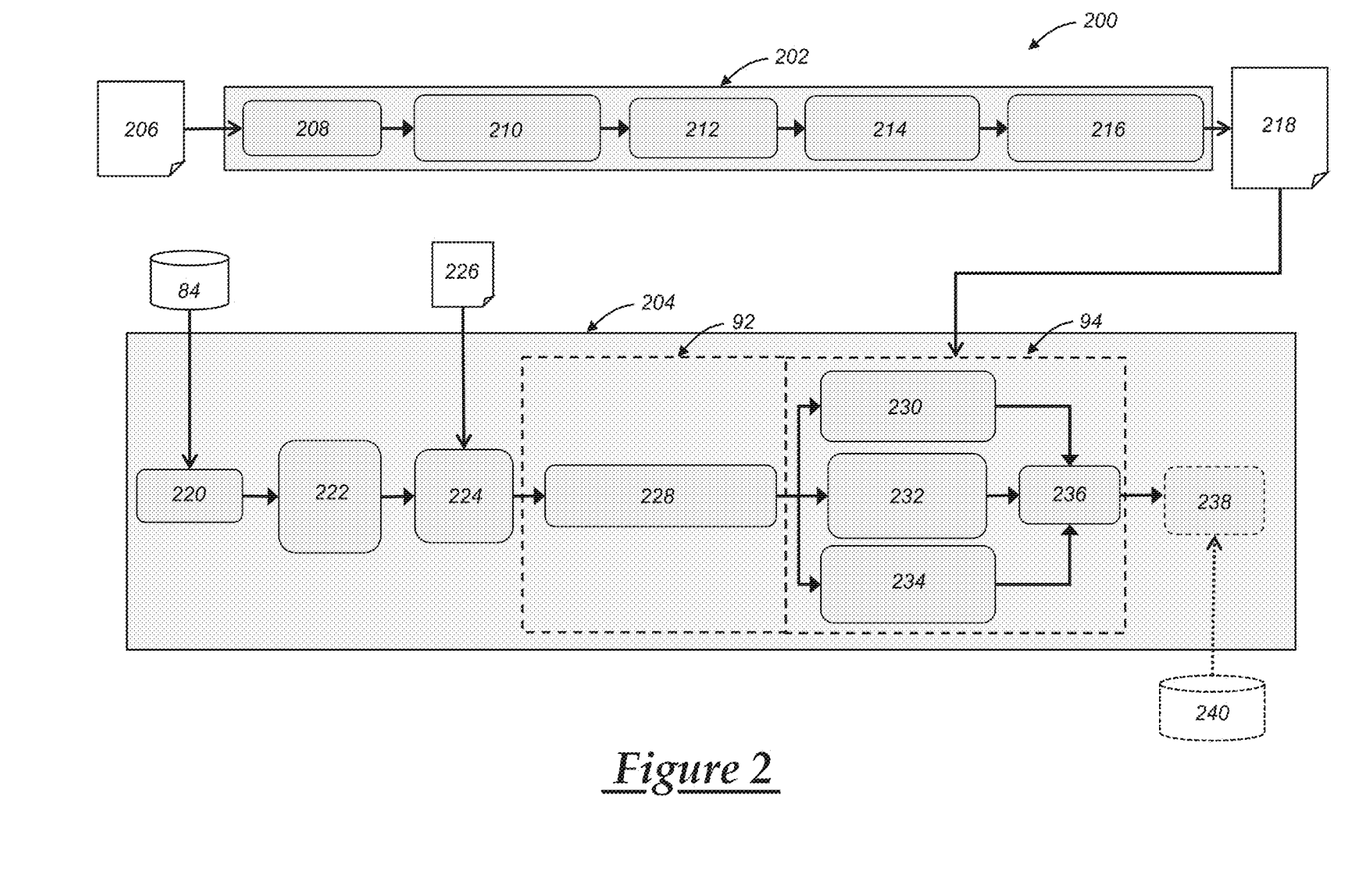
FIG. 2 is a flow chart depicting an embodiment of a method for extracting a relevant phrase from text.

Turning now to FIG. 2, there is shown an exemplary implementation of a method 200 for extracting a relevant phrase from text. The method 200 may be used to extract relevant phrases, such as those dealing with particular parts, symptoms, and actions relating to vehicles, in a more efficient manner. Further, the method may automatically and effectively extract phrases from un-structured text and reduce the number of irrelevant or non-useful phrases. The increase in efficiency may correlate with a reduction in time and memory intensive computing requirements involved in text analysis. Moreover, the method may be adaptable to provide for multi-lingual application capabilities. The use of specific seeds in the text analysis can provide for a more targeted analysis by reducing the requisite search space. Adding a filter-based criticality evaluation can further enhance the text analysis.

The method 200 includes a training phase 202 and a testing phase 204. The training phase 202 may only need to be performed one time, depending on the desired implementation. The method 200 may be carried out using all or parts of the communication system 10 of FIG. 1; for example, by carrying out various steps using the call center 20. Alternatively, the method 200 may be implemented using any other operable system. The computing hardware capable of carrying out the training phase 202 and the testing phase 204 could be implemented in a wide variety of common or discrete locations.

The training phase 202 begins with a selected list of verbatim 206. According to one embodiment, the verbatim is a vehicle information verbatim, which, as described above, may include any vehicle-related text which could be the subject of analysis. The selected list of verbatim 206 is tokenized in step 208 of the training phase 202. Tokenization may be performed in any operable fashion using one or more algorithms. In one embodiment, the tokenization is done by separating the verbatim based on the location of spaces, but the tokenization could be done on any sequence of characters.

Figure 3:
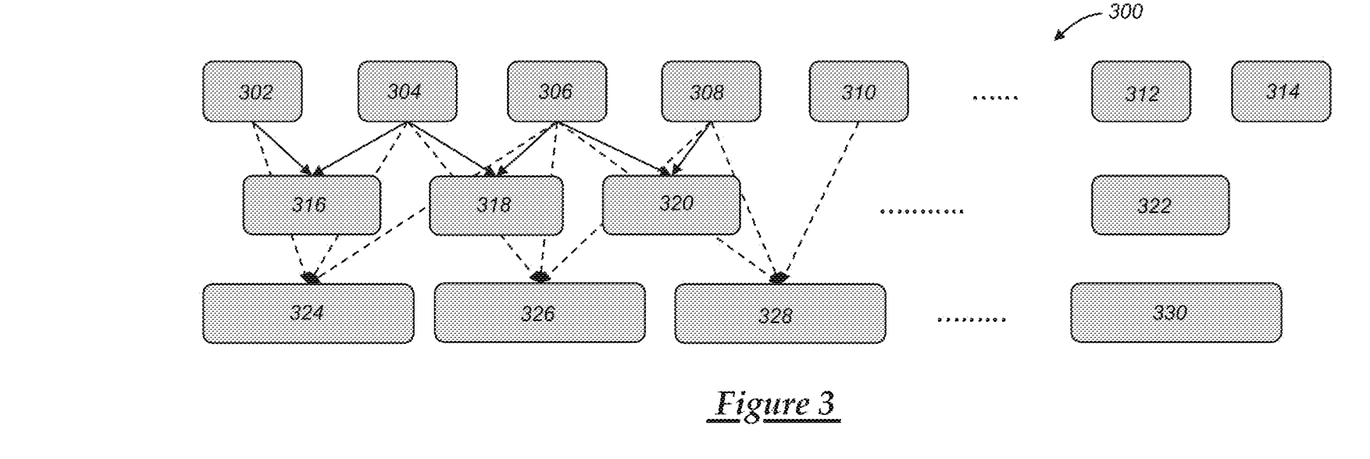
FIG. 3 is a block diagram depicting a process for building n-gram phrases.

Step 210 of the training phase 202 involves building n-gram phrases by a standard process. The n-grains could be bi-grams, tri-grams, or more. FIG. 3 schematically illustrates a standard n-gram building process 300 with a tokenized verbatim 302-314, each block representing a token or term, bi-grams 316-322, and tri-grams 324-330. It should be understood, however, that more n-grams could be built, and that the tokenized verbatim could have many more terms. The standard n-gram building process can involve significant time and memory intensive computing depending on the number of terms or tokens.

Step 212 of the training phase 202 involves parts of speech (POS) tagging each of the n-gram phrases. POS tags may help, in some examples, to distinguish between relevant and irrelevant phrases. To cite one example, a noun-verb bi-gram may be considered more relevant than a verb-verb-verb tri-gram. Certain relevant POS tag sequences may be stored in a database along with certain irrelevant POS tag sequences, and the POS tagged n-gram phrases can be compared to the stored sequences. One truncated example list of relevant and irrelevant POS tag sequences is provided below in Table 1. Different and more numerous examples of relevant and irrelevant POS tag sequences will be apparent to those skilled in the art. Additionally, if multi-lingual verbatims are analyzed, adjustments may need to be made to the POS tagger to account for other common linguistic phraseologies.

TABLE 1

| Relevant POS Tag Sequence | Irrelevant POS Tag Sequence |
|---|---|
| Determiner, Noun, Preposition, Noun | Noun, Conjunction, Determiner |
| Noun, Noun, Noun | Noun, Adjective |
| Noun, Preposition, Noun | Noun, Noun, Noun |
| Adjective, Noun | Verb, Verb, Verb |
| ... | ... |

Step 214 of the training phase 202 involves manually identifying relevant phrases. Depending on the vehicle information or text to be analyzed, the relevant phrases will vary. For example, when analyzing warranty claim information for problems with an infotainment module, relevant phrases may include "unplugged radio," "hook up problem," and "no codes in system," whereas irrelevant phrases may include "scanned radio," radio display for any," and "up problem scanned."

Step 216 of the training phase 202 involves collecting the relevant and irrelevant POS tag sequences separately. This results in a relevant and irrelevant POS tag and training terms collection 218 which can be used in the testing phase 204 as will be described in further detail below. This collection 218 can be stored or saved in any operable database or storage location.

During the testing phase 204, when the bulk of the text may be processed, verbatims are collected in step 220, which may be vehicle information verbatims from the vehicle information database 84. In one example, the vehicle information database 84 includes vehicle information verbatims relating to warranty performance by region, business, unit, assembly plant, program, and/or engineering team. Other verbatim types are certainly possible.

Step 222 of the testing phase 204 involves tokenizing the verbatim, which may be performed in any operable fashion using one or more algorithms. In one embodiment, the verbatim is tokenized to terms in order. As with step 210 of the training phase 202, the tokenization is done by separating the verbatim based on the location of spaces, but the tokenization could be done on any sequence of characters.

Step 224 of the testing phase 204 involves identifying a seed in the tokenized verbatim. This step may be accomplished using a seed list 226. In one embodiment, each seed is an important term or keyword of sorts, although other seed forms are certainly possible, such as a list of characters, to cite one example. The seeds in this embodiment may consist of a vehicle-related component or a vehicle-related functionality, such as a symptom, action, or part. In a more particular embodiment, the seed list is particular to the vehicle information verbatims being analyzed, or in other words, the seed list is directed to a specific vehicle system. For example, there could be a body control module seed list which includes seeds such as dimming (symptom), crank (action), and lamp (part). In another example, there could be a powertrain seed list which includes seeds such as dragging (symptom), tighten (action), and clutch (part). There could be an engine-related seed list which includes seeds such as knock (symptom), replace (action), plug (part). Other seed list types and example seeds are certainly possible.

Figure 4:
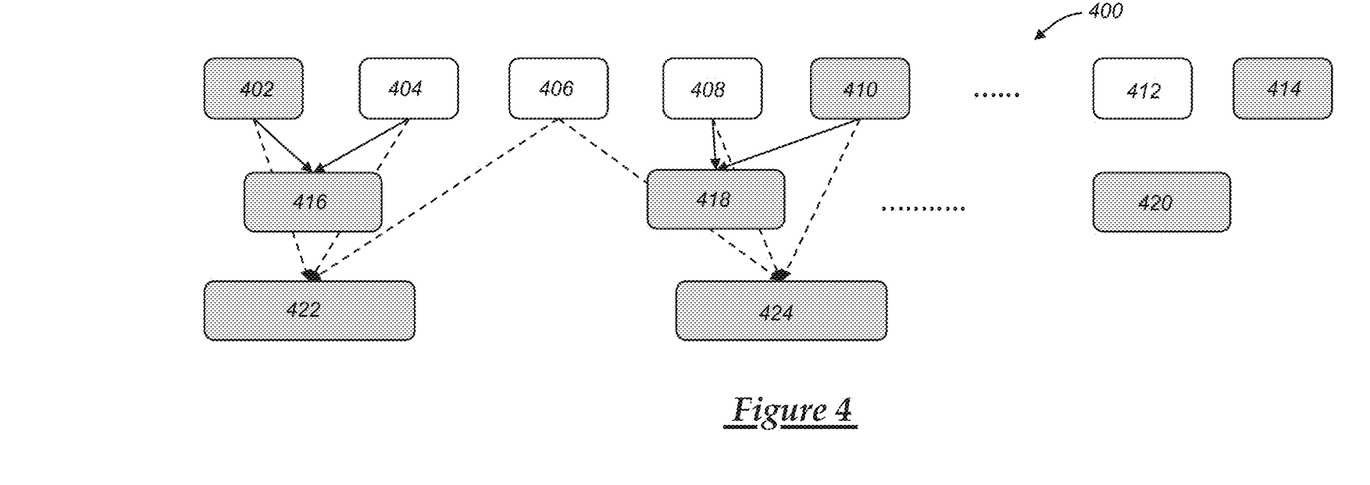
FIG. 4 is a block diagram depicting another process for building n-gram phrases.

Once a seed is identified in step 224, n-gram phrases are built in step 228 using the seed as a start, an end, or a middle of the n-gram phrase. In one embodiment, this step can be done with the n-gram building tool 92. The n-grams may be bi-grams, tri-grams, 4-grams, 5-grams, etc., depending on the desired implementation. In accordance with one embodiment illustrated more particularly in FIG. 4, both bi-grams and tri-grams are built in step 228. In FIG. 4, reference numerals 402, 410, and 414 represent seed terms, whereas reference numerals 404, 406, and 408 represent non-seed terms. In accordance with step 224, bi-grams 416 and 418 are built with seed 402 as the start of bi-gram 416 and seed 410 as the end of bi-gram 418. Bi-gram 420 is built with seed 414 as the end. Tri-grams 422 and 424 are built with seed 402 as the start of the tri-gram 422 and seed 410 as the end of tri-gram 424. It is also possible to have a seed as the middle of the tri-gram or another n-gram.

In a specific example, a vehicle information verbatim for a vehicle infotainment system service record may read: "RADIO DISPLAY INOP NAVIGATION INOP. UNPLUGGED RADIO AND REPLUGGED IN TO MAKE SURE WASN'T A HOOK UP PROBLEM, SCANNED RADIO DISPLAY FOR ANY CODES AND NO CODES IN SYSTEM. TRIED TO RUN THE LATEST UPDATES AND NOTHING AVAIL FOR U16 RADIO." In this example, seeds may include radio, problem, and codes. Table 2 below includes some (but not all) of the n-gram phrases built in accordance with step 228.

TABLE 2

| N-Gram | Phrases |
| --- | --- |
| 2-gram | UNPLUGGED RADIO |
| 2-gram | SCANNED RADIO |
| 3-gram | UP PROBLEM SCANNED |
| 3-gram | HOOK UP PROBLEM |
| 4-gram | RADIO DISPLAY FOR ANY |

TABLE 2-continued

| N-Gram | Phrases |
| --- | --- |
| 4-gram | NO CODES IN SYSTEM |
| ... | ... |

Building the n-gram phrases in accordance with step 228 in which a seed is used as the start, middle, or end of the n-gram phrase can lead to an approximately 65% reduction in irrelevant phrases, thereby resulting in effective time, memory, and processing management. In one example, when looking at bi-, tri-, and four-gram phrases in 10,000 verbatim with an average size of 40 words, the standard n-gram building technique (FIG. 3) results in over a million phrases, whereas with the n-gram building technique of step 228 (FIG. 4), there are only around 0.36 million phrases for a similarly sized verbatim containing approximately 4 seed terms. Accordingly, this targeted expansion technique can lessen intensive computing requirements involved in text and data analytics. Moreover, adapting seed lists 226 such that they correspond to particular trends or information of interest can further enhance the phrase building technique, in some embodiments.

The testing phase 204 of the method 200 then filters the plurality of n-gram phrases to obtain relevant phrases. This may be accomplished with a filtering tool 94, which may be located in a single platform or amongst multiple discrete computing platforms. In one embodiment, the filtering stage of the method involves three steps or the calculation of three factors which are then weighted, combined, or otherwise used to obtain evaluate the criticality of the phrases. While the filtering stage of the method is described in the context of this tri-filter criticality evaluation, other filtering methods are certainly possible.

Step 230 involves calculating an external relevance factor for each n-gram phrase of the plurality of n-gram phrases obtained in step 228. The external relevance factor accounts for the relevance of the terms and the sequence with regard to external text. For example, the n-gram phrases may be compared to a selected document such as an owner's manual or other technician-related technical document if a vehicle information verbatim is being analyzed. In a general sense, the external relevance factor provides a value of how close the n-gram phrases are to the selected comparison document. As with the seed list, the selected comparison document may relate to a specific vehicle system or the like, and the selected comparison document may be changed or altered to obtain a desired level of accuracy.

In one embodiment, the external relevance factor may use the relevant and irrelevant training terms 218 obtained in the testing phase 202 as a point of comparison. An external relevance distance calculation function, an example of which is provided below as Equation 1, may be used to obtain the external relevance factor.

$$\text{Distance}(W_{Seq_i}) = \frac{N_{GL(W_{Seq_i})} \times f_{SL(W_{Seq_i})}}{\left(1 + f_{GL(W_{Seq_i})}\right) + N_{SL(W_{Seq_i})}} \quad \text{(Equation 1)}$$

where $N_{GL}$ is the total number of phrases of the same length from the training phase, $N_{SL}$ is the total number of phrases of the same length from the testing phase, $f_{SL}$ is the frequency of the word sequence from the testing phase, and $f_{GL}$ is the frequency of the word sequence from the training phase. Continuing with the infotainment example provided above and detailed in Tables 1 and 2, the following external relevance factors may be calculated, with a lower external relevance factor indicating a phrase that is likely more relevant, as provided in Table 3, below. In accordance with one embodiment, an external relevance factor that is less than or equal to 0.5 is preferred and is typically more likely to indicate a relevant phrase.

TABLE 3

| Phrases | External Distance Factor |
| --- | --- |
| UNPLUGGED RADIO | 0.30 |
| HOOK UP PROBLEM | 0.42 |
| NO CODES IN SYSTEM | 0.21 |
| SCANNED RADIO | 0.65 |
| RADIO DISPLAY FOR ANY | 0.78 |
| ... | ... |

As can be seen with reference to Table 3, the phrases UNPLUGGED RADIO, HOOK UP PROBLEM, and NO CODES IN SYSTEM are more likely to be relevant, given that the external relevance factor for each phrase is less than or equal to 0.5. Again, other ways of calculating the external relevance factor, and accordingly, the threshold for determining relevancy based on the calculated external relevance factor, are certainly possible.

Step 232 involves calculating an internal relevance factor for each n-gram phrase of the plurality of n-gram phrases obtained in step 228. The internal relevance factor analyzes the relevance of the terms and the sequence with regard to the corpus text, or rather, in an embodiment, with regard to all of the vehicle information in database 84 being analyzed. In one embodiment, the internal relevance factor takes into account the term frequency—inverse document frequency (tf-idf), which can recognize that sometimes a phrase such as UNPLUGGED RADIO which occurs often may be relevant, whereas a phrase such as ANY OF which occurs even more often may not be relevant. The internal relevance factor may be calculated in accordance with Equations 2 and 3:

$$tfidf(W_{seq}, d, D) = tf(W_{seq}, d) \times idf(W_{seq}, D) \quad \text{(Equation 2)}$$

$$idf(W_{seq}, D) = \log \frac{N}{|\{d \in D : W_{seq} \in d\}|} \quad \text{(Equation 3)}$$

where N is the total number of documents in the corpus or the total number of documents being analyzed in the testing phase 204, $|\{d \in D: W_{seq} \in d\}|$ is the number of documents where the word sequence ($W_{seq}$) appears, and tf ($W_{seq}$, d) is the number of times the word sequence ($W_{seq}$) appears in the document (d).

In this particular embodiment of calculating the internal relevance factor, if Equations 2 and 3 used, an internal relevance factor that is greater than or equal to 0.4 may indicate a relevant phrase. Continuing with the infotainment system example provided above, the following internal relevance factors may be calculated in step 232.

TABLE 4

| N-Gram | N-Gram Phrase | Internal Relevance Factor |
| --- | --- | --- |
| 2-gram | UNPLUGGED RADIO | 0.6 |
| 3-gram | HOOK UP PROBLEM | 0.7 |
| 3-gram | UP PROBLEM SCANNED | 0.3 |
| 4-gram | NO CODES IN SYSTEM | 0.4 |
| ... | ... | ... |

Accordingly, based on the calculated internal relevance factor, the phrases UNPLUGGED RADIO, HOOK UP PROBLEM, and NO CODES IN SYSTEM, may be relevant, whereas the phrase UP PROBLEM SCANNED, may not be relevant. As with the external relevance factor, other ways of calculating the internal relevance factor are certainly possible, and thus, the threshold for determining relevancy based on the calculated internal relevance factor may vary depending on the desired implementation.

Step 234 involves calculating a context pattern relevance factor for each n-gram phrase of the plurality of n-gram phrases obtained in step 228. In general, the context pattern relevance factor provides a quantitative analysis of the grammatical relevance of the word sequence in each n-gram phrase and can disambiguate the phrase. This step may use the relevant phrase POS tags and the irrelevant phrase POS tags 218 obtained in step 216 of the training phase 202, examples of which are provided in Table 1. In this particular example of calculating the context pattern relevance factor, since an either/or analysis is performed, each n-gram phrase may be given a binary value such as 1 or 0 for the context pattern relevance factor depending on whether the POS tag is relevant or irrelevant. Continuing with the infotainment system example, the n-gram phrases below may be assigned the following POS tag sequence (Table 5) and may be given the following context pattern relevance factor (Table 6).

TABLE 5

| N-Gram | N-Gram Phrase | POS Tag Sequence |
| --- | --- | --- |
| 2-gram | UNPLUGGED RADIO | Adjective, Noun |
| 3-gram | HOOK UP PROBLEM | Noun, Preposition, Noun |
| 4-gram | NO CODES IN SYSTEM | Determiner, Noun, Preposition, Noun |
| ... | ... | ... |

TABLE 6

| N-Gram | N-Gram Phrase | Context Pattern Relevance Factor (Re = 0/1\|Ir = 0/1) |
| --- | --- | --- |
| 2-gram | UNPLUGGED RADIO | Re = 1\|Ir = 0 |
| 3-gram | HOOK UP PROBLEM | Re = 1\|Ir = 0 |
| 4-gram | NO CODES IN SYSTEM | Re = 1\|Ir = 0 |
| 4-gram | RADIO DISPLAY FOR ANY | Re = 0\|Ir = 1 |
| ... | ... | ... |

Given the POS tag sequences in Table 5, for example, the context pattern relevance factors in Table 6 indicate that the phrases UNPLUGGED RADIO, HOOK UP PROBLEM, and NO CODES IN SYSTEM are relevant, whereas the phrase RADIO DISPLAY FOR ANY is irrelevant. As with the external relevance factor and the internal relevance factor, other ways of calculating the context pattern relevance factor are certainly possible, and thus, the threshold or value for determining relevancy based on the calculated context pattern relevance factor may vary depending on the desired implementation.

Step 236 of the method involves identifying relevant phrases using a filtration rule set which accounts for the external relevance factor calculated in step 230, the internal relevance factor calculated in step 232, and/or the context pattern relevance factor calculated in step 236. The filtration rule set may include any operable method of weighting, averaging, combining, etc. the external relevance factor, the internal relevance factor, and/or the context pattern relevance factor. Further, the filtration rule set may vary between weak (i.e., more phrases are considered) and strong (i.e., less phrases are considered). For example, when considering the external relevance factor, the internal relevance factor, and the context pattern relevance factor, a weak rule set may require that a phrase be ignored only if all three factors indicate the n-gram phrase is irrelevant (i.e., conjunctively), whereas a strong rule set may require that a phrase be ignored if one or more of the three factors indicate that the n-gram phrase is irrelevant (i.e., disjunctively). Accordingly, the filtering rule set may filter based on an irrelevance threshold for one or more of the factors. As detailed in the infotainment example, n-gram phrases may be ignored, thereby leaving relevant phrases, if the external distance factor is greater than 0.5, the internal distance factor is less than 0.4, and/or if the context pattern relevance factor is Re=0|Ir=1. This rule set indicates that the relevant phrases are UNPLUGGED RADIO, HOOK UP PROBLEM, and NO CODES IN SYSTEM. Again, the threshold values and filtration rules can be subject to experimentation and may be adapted based on the desired implementation.

Steps 238 and 240 of the method are optional processing steps. Step 238 involves further refining the list of relevant phrases and step 240 involves categorizing terms or objects in a subject matter or domain that shows their properties and the relations between them in a data organizational system. For example, the extracted phrases may be identified or restricted to a required domain. More particularly, step 238 or step 240 may identify only body, chassis, and/or engine related phrases. Other processing steps are certainly possible.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method for extracting a relevant phrase from text, comprising the steps of:

accessing a vehicle information verbatim from a database with a server having a processor that is at least partially configured as a special purpose text analyzer;

tokenizing the vehicle information verbatim;

building a plurality of n-gram phrases from the vehicle information verbatim with the server, wherein the plurality of n-gram phrases include a seed from a seed list as a start, a middle, or an end of each n-gram phrase of the plurality of n-gram phrases, wherein the seed list includes a plurality of seeds, each seed being directed to a vehicle-related component or a vehicle-related functionality; and filtering the plurality of n-gram phrases with the server to obtain the relevant phrase or an irrelevant phrase, wherein the filtering includes calculating an external relevance factor, an internal relevance factor, and a context pattern relevance factor, and the filtering includes using a weak filtering rule set or a strong filtering rule set, wherein the weak filtering rule set is used to conjunctively consider the external relevance factor, the internal relevance factor, and the context pattern relevance factor so that n-gram phrases are irrelevant if an irrelevance threshold is met for each of the external relevance factor, the internal relevance factor, and the context pattern relevance factor, and wherein the strong filtering rule set is used to disjunctively consider the external relevance factor, the internal relevance factor, and the context pattern relevance factor so that n-gram phrases are irrelevant if an irrelevance threshold is met for one of the external relevance factor, the internal relevance factor, or the context pattern relevance factor.

2. The method of claim 1, wherein the seed list is directed to a specific vehicle system.

3. The method of claim 2, wherein the seeds identify symptoms, parts, or actions.

4. The method of claim 1, wherein a training phase and a testing phase are performed, and the external relevance factor accounts for a total number of n-gram phrases having a same length in the training phase, the total number of n-gram phrases having the same length in the testing phase, a frequency of a word sequence in the training phase, and the frequency of the word sequence in the testing phase.

5. The method of claim 1, wherein the internal relevance factor takes into account a term frequency-inverse document frequency (tf-idf) analysis of vehicle information in the database.

6. The method of claim 1, wherein the context pattern relevance factor is a binary value that depends on whether the n-gram phrase has a relevant part of speech (POS) tag sequence or an irrelevant POS tag sequence.

7. The method of claim 1, further comprising a step of categorizing terms in the relevant phrase in a domain according to a property of the terms and a relation between the terms in a data organizational system.

8. A method for extracting a relevant phrase from text, comprising the steps of:

accessing a verbatim from a database with a server having a processor that is at least partially configured as a special purpose text analyzer;

tokenizing the verbatim;

building a plurality of n-gram phrases with the server from the verbatim, wherein the plurality of n-gram phrases include a seed from a seed list as a start, a middle, or an end of each n-gram phrase of the plurality of n-gram phrases, wherein the seed list includes a plurality of seeds;

calculating an external relevance factor for each n-gram phrase of the plurality of n-gram phrases;

calculating an internal relevance factor for each n-gram phrase of the plurality of n-gram phrases;

calculating a context pattern relevance factor for each n-gram phrase of the plurality of n-gram phrases; and using the external relevance factor, the internal relevance factor, the context pattern relevance factor, or a combination of one or more of the external relevance factor, the internal relevance factor, and the context pattern relevance factor to identify the relevant phrase or an irrelevant phrase from the plurality of n-gram phrases, wherein a weak filtering rule set is used to conjunctively consider the external relevance factor, the internal relevance factor, and the context pattern relevance factor so that n-gram phrases are irrelevant if an irrelevance threshold is met for each of the external relevance factor, the internal relevance factor, and the context pattern relevance factor.

9. The method of claim 8, wherein the verbatim is a vehicle information verbatim and the seed list is directed to a specific vehicle system.

10. A method for extracting a relevant phrase from text, comprising the steps of:

accessing a verbatim from a database with a server having a processor that is at least partially configured as a special purpose text analyzer;

tokenizing the verbatim;

building a plurality of n-gram phrases with the server from the verbatim, wherein the plurality of n-gram phrases include a seed from a seed list as a start, a middle, or an end of each n-gram phrase of the plurality of n-gram phrases, wherein the seed list includes a plurality of seeds;

calculating an external relevance factor for each n-gram phrase of the plurality of n-gram phrases;

calculating an internal relevance factor for each n-gram phrase of the plurality of n-gram phrases;

calculating a context pattern relevance factor for each n-gram phrase of the plurality of n-gram phrases; and using the external relevance factor, the internal relevance factor, the context pattern relevance factor, or a combination of one or more of the external relevance factor, the internal relevance factor, and the context pattern relevance factor to identify the relevant phrase or an irrelevant phrase from the plurality of n-gram phrases, wherein a strong filtering rule set is used to disjunctively consider the external relevance factor, the internal relevance factor, and the context pattern relevance factor so that n-gram phrases are irrelevant if an irrelevance threshold is met for one of the external relevance factor, the internal relevance factor, or the context pattern relevance factor.

11. The method of claim 9, wherein the seeds identify symptoms, parts, or actions.

12. The method of claim 10, wherein the verbatim is a vehicle information verbatim and the seed list is directed to a specific vehicle system.

13. The method of claim 12, wherein the seeds identify symptoms, parts, or actions.

* * * * *